United States Patent
Qiao (10) Patent No.: US 9,898,102 B2
(45) Date of Patent: Feb. 20, 2018

(54) BROADCAST PACKET BASED STYLUS PAIRING

(71) Applicant: Microsoft Technology Licensing, LLC, Redmond, WA (US)

(72) Inventor: Tianzhu Qiao, Portland, OR (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/067,880

(22) Filed: Mar. 11, 2016

(65) Prior Publication Data

US 2017/0262084 A1    Sep. 14, 2017

(51) Int. Cl.
| | |
|---|---|
| *G06F 3/033* | (2013.01) |
| *G06F 3/0354* | (2013.01) |
| *H04W 76/02* | (2009.01) |
| *G06F 3/038* | (2013.01) |
| *H04W 92/18* | (2009.01) |
| *G06F 1/16* | (2006.01) |

(52) U.S. Cl.
CPC ........ *G06F 3/03545* (2013.01); *G06F 3/0383* (2013.01); *H04W 76/023* (2013.01); *G06F 1/1698* (2013.01); *G06F 2203/0384* (2013.01); *H04W 92/18* (2013.01)

(58) Field of Classification Search
CPC ............... G06F 3/03546; G06F 1/1698; G06F 3/03545; G06F 3/0383; H04W 76/023; H04W 92/18
USPC ........................................ 345/179; 178/19.07
See application file for complete search history.

(56) References Cited

U.S. PATENT DOCUMENTS

| | | |
|---|---|---|
| 5,565,658 A | 10/1996 | Gerpheide et al. |
| 8,933,913 B2 | 1/2015 | Nowatzyk et al. |
| 9,081,448 B2 | 7/2015 | Geaghan |
| 9,116,571 B2 | 8/2015 | Zeliff et al. |
| 2004/0056849 A1 | 3/2004 | Lohbihler et al. |
| 2007/0197256 A1 | 8/2007 | Lu et al. |
| 2008/0169132 A1* | 7/2008 | Ding ..................... G06F 3/0433 178/19.02 |
| 2008/0238885 A1 | 10/2008 | Zachut et al. |

(Continued)

OTHER PUBLICATIONS

"Apps, Pairing and Getting Started with Bamboo Stylus fineline", Published on: May 5, 2015, available at: http://bamboo.wacom.com/apps-pairing-and-getting-started-with-bamboo-stylus-fineline/.

(Continued)

*Primary Examiner* — Adam J Snyder
(74) *Attorney, Agent, or Firm* — Alleman Hall Creasman & Tuttle LLP (57) ABSTRACT

Examples are disclosed herein that relate to pairing styluses to an interactive display. One example provides a stylus comprising a processor and memory holding instructions executable by the processor. The instructions are executable by the processor to, before sending a pairing request to a display, receive a broadcast packet indicating an occupancy of a set of stylus communication slots of the display, determine that at least one stylus communication slot is available based on the broadcast packet, and responsive to determining that the at least one stylus communication slot is available, selectively send the pairing request to occupy a stylus communication slot based on a pairing request history.

20 Claims, 3 Drawing Sheets

(56) References Cited

U.S. PATENT DOCUMENTS

| | | |
|---|---|---|
| 2009/0135162 A1 | 5/2009 | Van De Wijdeven et al. |
| 2012/0050231 A1 | 3/2012 | Westhues et al. |
| 2012/0062497 A1 | 3/2012 | Rebeschi et al. |
| 2014/0028576 A1 | 1/2014 | Shahparnia |
| 2015/0062448 A1 | 3/2015 | S. |
| 2015/0193033 A1 | 7/2015 | Westhues |
| 2015/0277587 A1* | 10/2015 | Chandran ............. G06F 3/0416 345/179 |
| 2015/0363012 A1* | 12/2015 | Sundara-Rajan ....... G06F 3/038 345/179 |
| 2016/0048234 A1 | 2/2016 | Chandran et al. |
| 2016/0246390 A1* | 8/2016 | Lukanc ................ G06F 3/0383 |
| 2016/0306445 A1* | 10/2016 | Fleck ................... G06F 3/0383 |
| 2016/0306448 A1* | 10/2016 | Fleck ................. G06F 3/03545 |

OTHER PUBLICATIONS

ISA European Patent Office, International Search Report and Written Opinion Issued in PCT Application No. PCT/US2017/020554, dated May 17, 2017, WIPO, 14 Pages.

* cited by examiner

BROADCAST PACKET BASED STYLUS PAIRING

BACKGROUND

An interactive display may be configured to receive input from a number of styluses simultaneously. Due to hardware, communication or other constraints, the number of styluses that may be used may be limited. As such, the interactive display and/or styluses may implement various protocols for handling stylus-display pairing requests in a multiple stylus environment.

DETAILED DESCRIPTION

As described above, an interactive display may be configured to receive input from a number of styluses simultaneously. Due to hardware and/or communication constraints, the number of paired styluses may be limited, however. As such, the interactive display and styluses may implement various mechanisms for handling requests to pair styluses with the display in the face of such limitations.

In one example setting, an interactive display may communicate with each of a limited number of styluses through a respective frequency channel or time slot associated with the stylus. When an unpaired stylus comes within communicative range of the interactive display, it may request pairing through a channel/slot already assigned to a paired stylus. This can cause a failed pairing attempt, or cause the already-paired stylus to become unpaired (i.e., the new stylus takes its place). When either of the two styluses is in an unpaired state, it may make further pairing attempts to the slot, which may perpetuate competition and interference between the styluses. Undesired competition (e.g., interfering communications over a radio link) can also occur where multiple unpaired styluses send competing pairing requests to pair into a single frequency channel or time slot. In any event, the user experience can be degraded by competitive and interfering communication among styluses.

To address the issues identified above, implementations are described herein for pairing styluses with interactive displays. In many examples, the implementations may be carried out via methods that minimize stylus interference and enable robust pairing.

Figure 1A:
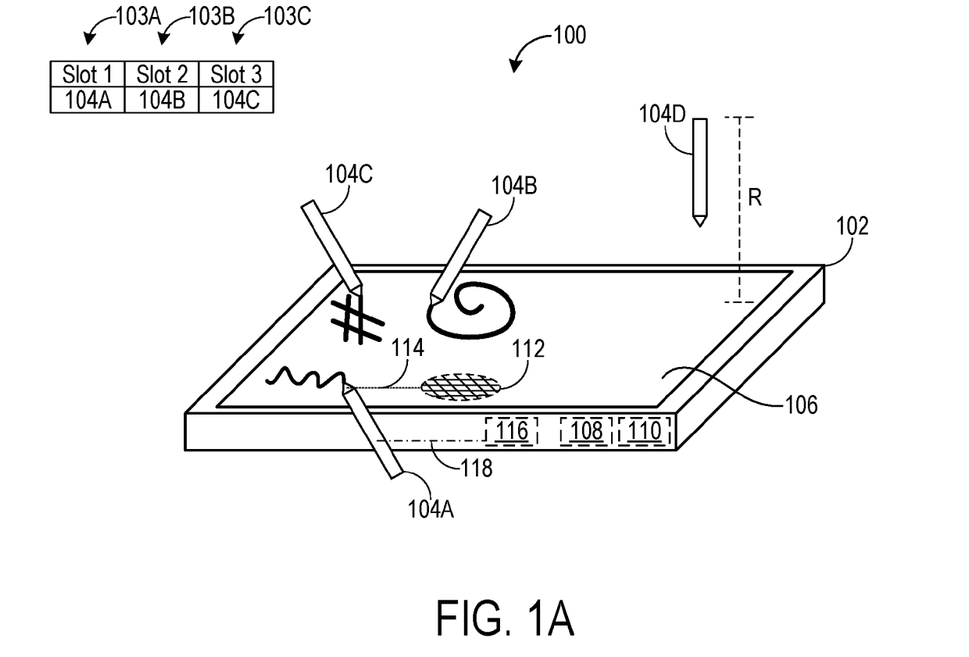
FIGS. 1A and 1B show respective states of an example interactive display system.

FIG. 1A shows an example interactive display system 100 including an interactive display 102 configured to interact with multiple styluses 104A-D. Interactive display 102 may be operable to output graphical content and carry out various computing device functions. To this end, interactive display 102 may include a display device 106, a processor 108, and memory 110 (the processor and memory being schematically depicted in FIGS. 1A and 1B). Memory 110 may hold instructions executable by processor 108 to carry out the approaches described herein.

Interactive display 102 may receive user input in a variety of forms. As an example, FIG. 1A depicts input received from styluses 104 by interactive display 102. To enable the reception of stylus input, interactive display 102 may include a touch sensor 112, which may be used to receive other forms of input including but not limited to touch and/or hover input from human digits or other input implements. Touch sensor 112 may also be used to form electrostatic links between interactive display 102 and styluses 104, such as an electrostatic link 114 formed between a conductive element (e.g., electrode tip) of a stylus 104A and the touch sensor, i.e., electrode-to-electrode capacitive coupling. Various suitable data/signals may be transmitted along electrostatic link 114, including but not limited to information (e.g., capacitance measurements) that enables determination of one or more coordinates (e.g., x, y-coordinates) of stylus 104A relative to interactive display 102. However, interactive display 102 may employ any suitable sensing technologies, including but not limited to capacitive, resistive, acoustic, frustrated total internal reflection (FTIR), and infrared sensing technologies. Further, interactive display 102 may be alternatively or additionally configured to receive input from peripheral devices, such as a mouse, keyboard, gamepad, microphone, etc.

Interactive display 102 may establish radio links with styluses 104. To this end, FIG. 1A schematically depicts the inclusion of a display-side radio transceiver 116 in interactive display 102. Transceiver 116 may be used to establish a radio link 118 with a stylus-side transceiver (not shown) in stylus 104A. Various suitable data/signals may be transmitted along radio link 118, including information regarding the occupancy of stylus communication slots as described below.

After a stylus 104 is paired with interactive display 102, it may communicate with the interactive display through a respective stylus communication slot. The stylus communication slots may be used for communication along one or both of electrostatic link 114 and radio link 118. The stylus communication slots, and the styluses that are paired into them, may be configured so that the communications and other activities of the styluses do not interfere with one another. The stylus communication slots may be temporal stylus communication slots, for example, in which case each stylus may communicate with interactive display 102 during a respective duration designated specifically for that stylus. In other words, the stylus communication slots may be configured so that stylus activity is time-division-multiplexed on a stylus-by-stylus basis. Other stylus communication slot types are contemplated, however, including those that differ in frequency or another aspect that prevents interference. Any suitable sharing mechanism may be employed that enables multiple styluses to simultaneously interact with the interactive display.

FIG. 1A depicts an example state of interactive display system 100 in which three styluses 104A-C are paired with interactive display 102. Accordingly, the paired styluses 104A-C can be used to supply input to interactive display 102 as shown in FIG. 1A. FIG. 1A also depicts a fourth unpaired stylus 104D that is brought within a communicative range R of interactive display 102, which may correspond to the useable range of electrostatic link 114 and/or radio link 118, for example. However, in this example, interactive display 102 only supports three styluses. In particular, interactive display 102 has three stylus communication slots 103A-C, which are shown as already occupied by the three paired styluses 104A-C, respectively. Were the unpaired stylus 104D to request pairing in this state (i.e., pairing slots are fully occupied), interference and a degraded user experience may result as described above.

To mitigate the above issues, interactive display 102 may transmit a broadcast packet indicating the occupancy of its stylus communication slots 103A-C. As described below, the broadcast packet may be configured to trigger transmission of a pairing request from a stylus 104 if the broadcast packet indicates a stylus communication slot is available. Conversely, the broadcast packet may be configured to prevent such triggering if the packet indicates no availability, i.e., that all slots are full. At the stylus side, the stylus may be configured to delay transmission of any pairing request until it receives a broadcast packet indicating a slot is available.

Before transmitting the broadcast packet, interactive display 102 may determine the occupancy of its set of stylus communication slots 103A-C. This may include determining which styluses 104 are paired with interactive display 102, for example. Interactive display 102 may then transmit the broadcast packet (e.g., via display-side radio transceiver 116), which may indicate slot occupancy (i.e., pairings) in various ways. In one example, the broadcast packet may include an identifier for each stylus occupying a stylus communication slot. A "null"/"invalid"/"empty" identifier may be used for unoccupied slots. Styluses 104 receiving the broadcast packet may assess these identifiers to identify pairings and whether slots are available or occupied. In some examples, a stylus can determine that it is paired by comparing its own identifier to an identifier sent in the broadcast packet (e.g., a match would indicate/confirm that the stylus is paired). In other examples, the broadcast packet may indicate whether or not each stylus communication slot is available via a bit flag or other indication. Further, the broadcast packet may include additional or alternative information, including but not limited to (1) an identifier indicating it is a broadcast packet; (2) an identifier associated with interactive display 102 (e.g., which may mitigate crosstalk and pairing issues in environments that incorporate multiple interactive displays); and (3) information for providing reliable data transfer (e.g., a cyclic redundancy check), to name but a few non-limiting examples.

As unpaired stylus 104D is within communicative range R of interactive display 102, it may receive the broadcast packet and, in response, determine whether any stylus communication slot is available before sending a pairing request. In particular, it may delay pairing requests so that they are sent no sooner than when an indication of slot availability is received. Since the three stylus communication slots 103A-C are occupied in the state depicted in FIG. 1A, unpaired stylus 104D may identify the lack of slot availability and forego sending a pairing request to interactive display 102. In this way, the transmission of pairing requests may be limited to times at which there is stylus communication slot availability, and competitive pairing transmissions may be avoided. While three stylus communications slots are described herein as an example, any suitable number of slots may be implemented.

Figure 1B:
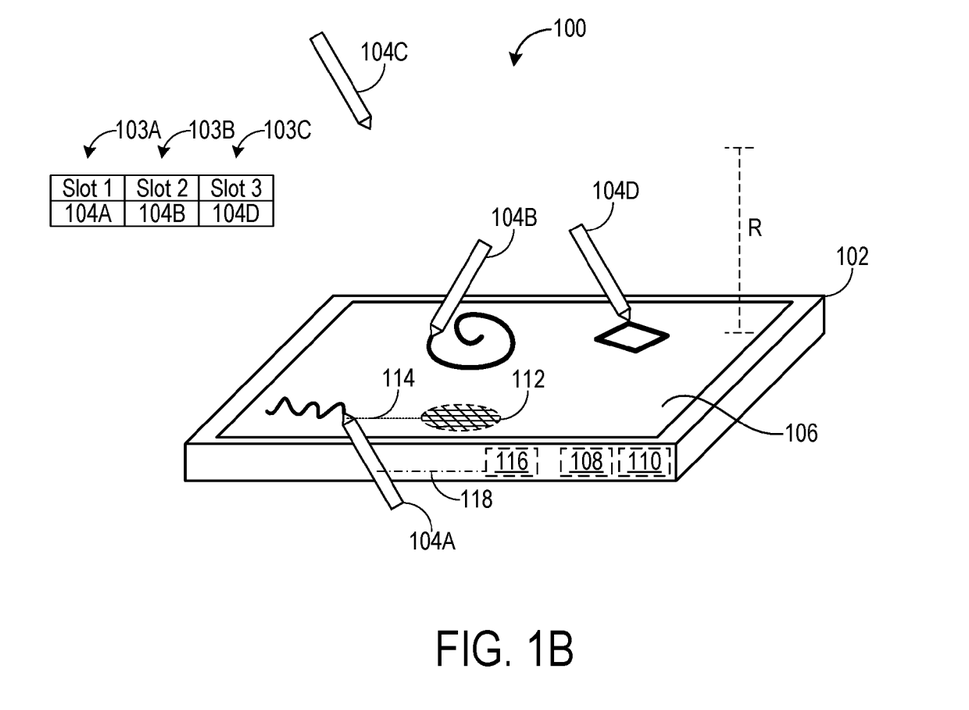

Turning now to FIG. 1B, a second state of interactive display system 100—different from the first state depicted in FIG. 1A—is shown. In this state, previously-paired stylus 104C is beyond communicative range R. Interactive display 102 may detect this, and in response, unpair stylus 104C and designate its stylus communication slot 103C as being available. The slot availability may then be conveyed in a subsequent broadcast packet (e.g., by omitting, from the subsequent broadcast packet, a valid stylus identifier associated with the slot).

Upon receiving the updated broadcast packet, previously unpaired stylus 104D may identify the availability of the stylus communication slot 103C previously occupied by stylus 104C. In response, stylus 104D may send a pairing request (e.g., via a corresponding radio link) to interactive display 102. Interactive display 102 may receive the pairing request and determine whether at least one stylus communication slot is available. If a stylus communication slot is available, stylus 104D may be paired to interactive display 102 and, for example, may occupy the slot 103C previously used by stylus 104C. Indeed, FIG. 1B shows stylus 104D paired with interactive display 102 instead of stylus 104C and in its formerly-occupied slot 103C. Once paired, interactive display 102 may include the stylus identifier corresponding to stylus 1041) in subsequent broadcast packets while the stylus remains paired. Further, interactive display 102 may transmit, following successful pairing of stylus 104D, an acknowledgment packet to the stylus indicating successful pairing. If interactive display 102 determines that no stylus communication slots are available, however, stylus 104D may not be paired. This may occur, for example, if another stylus were paired before stylus 104D could occupy the available slot.

Interactive display 102 may control stylus pairing based on periodic communication from, or other activity associated with, styluses 104. For example, paired styluses 104 may transmit, through respective stylus communication slots, various data such as coordinate information; button data (e.g., depressed or non-depressed, or depression magnitude); output of a force sensor; battery level; firmware version; etc. Each stylus communication slot may be part of an operating sequence of interactive display 102 that executes repeatedly at a frequency, such that each slot occurs during each execution of the operating sequence. Thus, interactive display 102 may expect to periodically receive certain data through a stylus communication slot when it is validly occupied. If a certain level of activity does not occur (e.g., a certain data transmission rate/frequency, data size, and/or data type not received), interactive display 102 may unpair the corresponding stylus and free up the slot.

In some implementations, the operating sequence referred to above may include an electrode scanning sequence (e.g., of touch sensor 112). This may include driving stylus/display electrodes to determine stylus position, synchronize styluses, support radio link communication, and electrostatically transmit data. A full electrode scan of touch sensor 112 may be referred to herein as a "frame." Interactive display 102 may transmit a broadcast packet during each frame, for example. Further, display-side radio transceiver 116 may be controlled according to an operating sequence at a precise timing based on the electrode scanning sequence, so as to transmit broadcast packets and receive data from styluses via radio links, for example.

Interactive display 102 may perform stylus unpairing when stylus activity ceases or significantly decreases. For example, interactive display 102 may determine whether an assigned stylus communication slot exceeds a threshold inactivity (i.e., activity falls below some minimum level). In some implementations, the threshold may correspond to a threshold number of frames for which data has not been received for the slot. A time/duration of inactivity may be employed, or any other type of inactivity, in addition to or instead of using a threshold number of frames.

Responsive to determining that an assigned stylus communication slot exceeds the threshold inactivity referred to above, interactive display 102 may unpair a stylus 104 occupying that slot and then designate it as being available. Interactive display 102 may then transmit an updated broadcast packet indicating availability of the slot, which may then trigger attempts by one or more styluses to pair to the slot. Using the example depicted in FIGS. 1A and 1B, interactive display 102 may unpair stylus 104C after determining that its assigned slot 103C exceeded the threshold of inactivity.

In some scenarios, interactive display 102 may identify only a single assigned stylus communication slot that can be freed up based on the threshold inactivity as described above. In other scenarios, interactive display 102 may evaluate an activity level of (e.g., all) the stylus communication slots and, based on the evaluation, determine that two or more slots exceed the threshold inactivity and thus can be freed. In this example, interactive display 102 may identify a least recently used (LRU) stylus communication slot from among the two or more slots and designate the LRU slot, as being available. Thus, in this example pairing through the LRU slot may be prioritized above pairing through other available slots. Interactive display 102 may identify the LRU stylus communication slot in response to receiving a stylus pairing request, for example, in which case the stylus may be paired at the LRU slot. Alternatively or additionally, interactive display 102 may identify the LRU slot whether or not a stylus pairing request is received, and may convey the availability of the LRU slot in broadcast packets transmitted after identifying the LRU slot.

Figure 2:
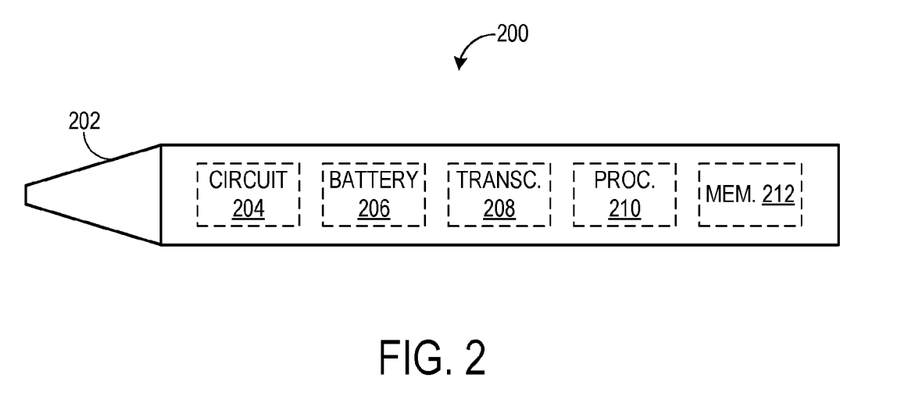
FIG. 2 shows an example stylus.

FIG. 2 shows an example stylus 200. Stylus 200 may be one of styluses 104 (FIG. 1), for example. Stylus 200 may include an electrode tip 202 to transmit and/or receive electrical signals. For example, electrode tip 202 may be operable to receive and/or transmit data to interactive display 102 (FIG. 1) along an electrostatic link formed between the tip and touch sensor electrodes (e.g., of touch sensor 112 of FIG. 1) in the display. Any suitable data may be transmitted and/or received via electrode tip 202, including but not limited to stylus coordinate data.

Stylus 200 may include a circuit 204 electrically coupled to electrode tip 202 and configured to perform analog/digital conversion. For example, circuit 204 may digitize incoming analog electrical signals received through electrode tip 202, where the digitized signals may then be processed, and may convert digital signals to analog signals for transmission through the electrode tip.

Stylus 200 may include a battery 206 for powering one or more components of the stylus, such as circuit 204. Battery 206 may be rechargeable in some implementations, where the recharge process may be carried out when stylus 200 is coupled to a suitable power source (e.g., a stylus charger included in an interactive display).

Stylus 200 may include a stylus-side radio transceiver 208. Stylus-side radio transceiver 208 may be operable to establish a radio link with interactive display 102 (FIG. 1), for example. Stylus-side radio transceiver 208 may be used to transmit data such as pairing requests, for example. Pairing requests may assume various suitable forms. In one example, a pairing request may include one or more of (1) an identifier indicating it is a pairing request, (2) an identifier of the interactive display for which the request is intended (e.g., which may mitigate crosstalk and pairing issues in environments that incorporate multiple interactive displays), (3) an identifier of the stylus from which the request is sent, and (4) information for providing reliable data transfer (e.g., a cyclic redundancy check).

Stylus 200 may include a processor 210 and memory 212 holding instructions executable by the processor to effect the approaches described herein. The stylus instructions may be executable to, before sending a pairing request to an interactive display, receive a broadcast packet indicating an occupancy of one or more stylus communication slots of the display. The instructions may be executable to determine that at least one stylus communication slot is available based on the broadcast packet, and responsive to determining that the at least one stylus communication slot is available, selectively send the pairing request to occupy a stylus communication slot based on a pairing request history. Conversely, the instructions may be executable to determine that no stylus communication slot is available, and responsive to determining that no stylus communication slot is available, wait for a future broadcast packet indicating slot availability before sending the pairing request.

In some implementations, the pairing request history may be used to throttle pairing request transmission to reduce interference and futile attempts at pairing. For example, the pairing request history may include a number of pairing requests sent by the stylus (e.g., in a given use session). In this example, selectively sending a pairing request based on the pairing request history may include sending the pairing request after an interval that increases as a function of the number of pairing requests sent by the stylus. Any suitable function may be used.

In one example, the wait interval referred to above may be configured as a number of frames (e.g., of the operating sequence of an interactive display) to wait before sending a subsequent pairing request, with the number being decremented upon passing of each frame. Such an approach may be particularly applicable for scenarios in which failed pairing requests are indicative or suggestive of continual failure to pair, for example due to communication conflict among two or more styluses that try to pair through the same slot. The pairing request history may be configured in alternative manners, however, including those in which the wait interval decreases as a function of the number of sent pairing requests. Further, other criteria may be used alternatively or in addition to the pairing request history. For example, stylus battery level may be considered such that wait interval for pairing requests increases with decreasing battery level.

The wait interval after which pairing requests are sent may be randomized. As one example, in which the wait interval is implemented via frames as described above, stylus 200 may represent this as a variable WAIT_FRAMES. WAIT_FRAMES may be calculated by randomly selecting a number between a minimum and a maximum number of wait frames. Specifically, it may be calculated to be between MIN_WAIT_FRAMES and MAX_WAIT_FRAMES, where MIN_WAIT_FRAMES may be zero, and MAX_WAIT_FRAMES may be calculated as min(2^SENT_REQUESTS, MAX_WAIT_LIMIT), where min is a function that outputs the minimum of its inputs, SENT_REQUESTS is the number of pairing requests sent from the stylus, and MAX_WAIT_LIMIT is a variable or constant establishing a maximum number of frames to wait before sending a subsequent pairing request. This is but a non-limiting example—other suitable mechanisms for randomizing the interval are contemplated. Randomization of the wait interval may mitigate potential interference by reducing the potential for simultaneous pairing requests competing for stylus communication slots.

Concluding FIG. 2, the instructions held by memory 212 may be executable to, after sending a pairing request to occupy a stylus communication slot, receive an acknowledgment packet indicating pairing of stylus 200 to an interactive display.

Figure 3:
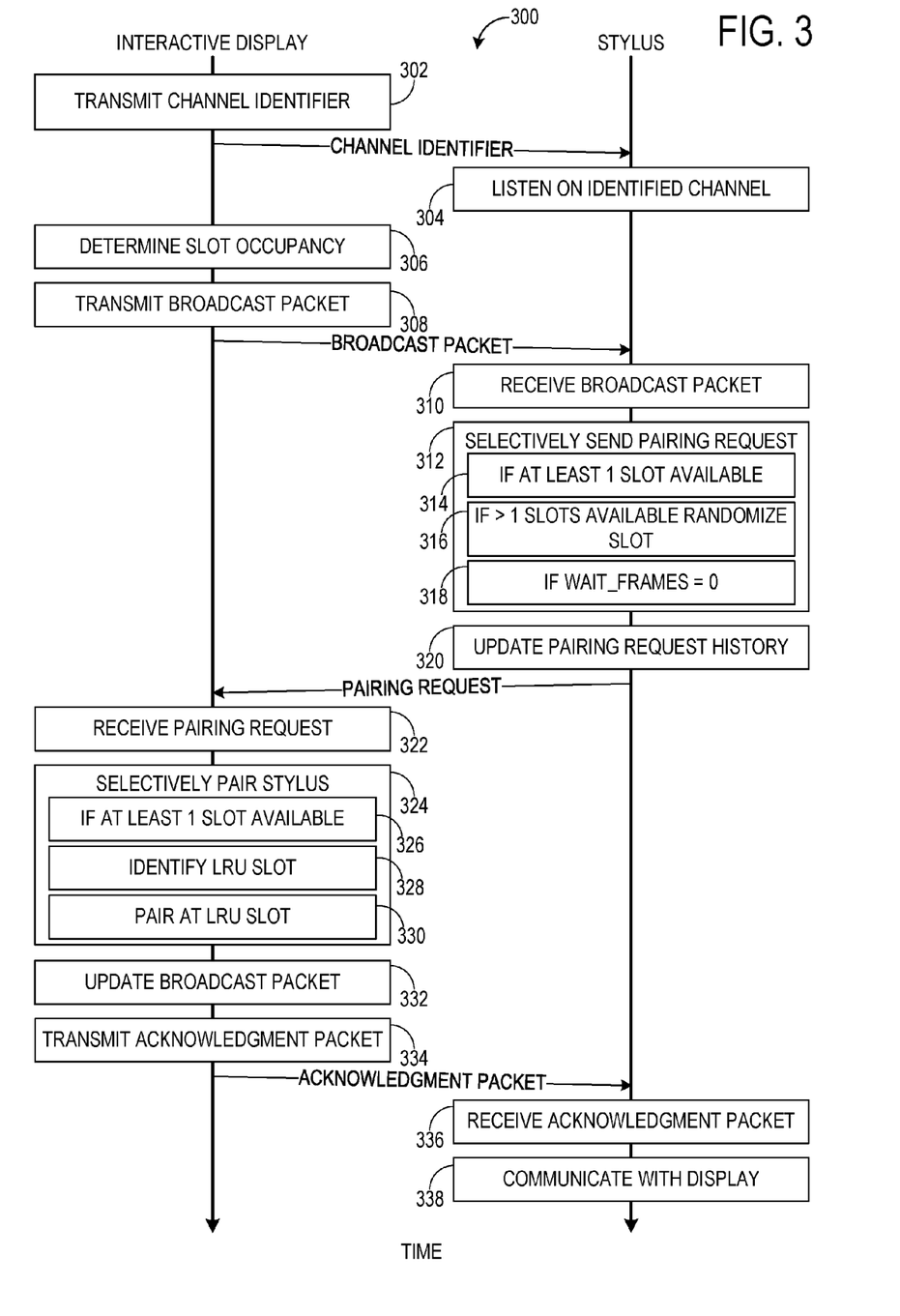
FIG. 3 shows a flowchart illustrating an example method of pairing a stylus to an interactive display.

FIG. 3 shows a flowchart illustrating an example method 300 of pairing a stylus to an interactive display. With reference to FIG. 1, method 300 may be performed to pair one or more of styluses 104 with interactive display 102, for example. Further, method 300 may represent potential actions taken in a given frame of an operating sequence of the interactive display (e.g., an electrode scanning sequence), such that at least a portion of the method may be performed for each frame.

At 302, method 300 may include transmitting, from the interactive display, a channel identifier to the stylus. The channel identifier may identify the channel of a radio link along which communication between the interactive display and stylus is to occur. The channel identifier may be transmitted via an electrostatic link, for example.

At 304, method 300 may include listening, at the stylus, on the channel identified by the channel identifier transmitted at 302.

At 306, method 300 may include determining, at the interactive display, an occupancy of a set of stylus communication slots. Determining the occupancy of the set of stylus communication slots may include determining the identifiers of styluses that occupy the slots. As described above, an "invalid" identifier or other mechanism may be used to indicate unoccupied slots. In some implementations, the interactive display may compare the activity of one or more (e.g., all) of the stylus communication slots to a threshold inactivity as part of determining slot occupancy. Responsive to determining that the stylus communication slot exceeds the threshold inactivity, the interactive display may unpair an occupant of the slot and designate the slot as being available (e.g., by removing the stylus identifier corresponding to the occupant from subsequent broadcast packets). If two or more stylus communication slots exceed the threshold inactivity, the interactive display may unpair the occupants of those slots and designate those slots as being available. The threshold inactivity may be defined as a number of frames or a threshold duration for which data has not been received through a stylus communication slot, for example.

At 308, method 300 may include transmitting, from the interactive display, a broadcast packet to the stylus. The broadcast packet may indicate the occupancy of the set of stylus communication slots. The broadcast packet may be configured to trigger transmission of a pairing request from the stylus if the broadcast packet indicates stylus communication slot availability.

At 310, method 300 may include receiving, at the stylus, the broadcast packet transmitted at 306. The stylus may be configured to forego the transmission of pairing requests unless the broadcast packet indicates stylus communication slot availability. Method 300 contemplates scenarios in which the stylus is unpaired with the interactive display, though scenarios are possible in which the stylus is already paired with the display. In the case that the stylus is already paired with the display, the identifier of the stylus may be transmitted in the broadcast packet and recognized by the stylus as a confirmation/acknowledgment of continued pairing.

At 312, method 300 may include selectively sending, from the stylus, a pairing request to the interactive display to occupy a stylus communication slot. Selectively sending the pairing request may include, at 314, sending the pairing request if at least one stylus communication slot is available. As such, method 300 may include determining, at the stylus, that at least one stylus communication slot is available based on the broadcast packet. The stylus may wait for a future broadcast packet before sending the pairing request, in the event that it determines unavailability based on the current broadcast packet. Accordingly, in many examples the stylus may withhold and/or delay transmission of pairing requests until, and not before, a broadcast packet is received that indicates slot availability. In this way, interference, competitive stylus communication, and the undesired eviction of a paired stylus can be mitigated.

Selectively sending the pairing request may include, at 316, randomly selecting one of two or more stylus communication slots through which the pairing request is sent in response to determining that at least two slots are available. Selectively sending the pairing request may include, at 318, sending the pairing request if WAIT_FRAMES=0. As described above, WAIT_FRAMES may be a variable calculated as a function of a pairing request history. If WAIT_FRAMES>0, the stylus may forego sending the pairing request and may wait until a sufficient number of frames have passed until WAIT_FRAMES=0, at which point stylus communication slot availability may be reevaluated. As such, selectively sending the pairing request may be based on a pairing request history. As described above, the use of pairing request history and randomization of WAIT_FRAMES may allow two or more styluses to employ different wait intervals before transmitting pairing requests, such that interference and competitive transmission otherwise resulting from the concurrent transmission of pairing requests can be mitigated.

At 320, method 300 may include updating, at the stylus, the pairing request history. Updating the pairing request history may include incrementing SENT_FRAMES and/or generating WAIT_FRAMES as described above. Implementations in which at least a portion of the pairing request history is maintained and/or updated at the interactive display are contemplated, however.

At 322, method 300 may include receiving, at the interactive display, the pairing request to occupy a stylus communication slot sent from the stylus at 312. Method 300 contemplates scenarios in which the stylus is unpaired with the interactive display, though scenarios are possible in which the stylus is already paired with the display, in which case the interactive display may recognize the pairing (e.g., by evaluating the identifier of the stylus); the display may then update the broadcast packet with the stylus identifier and may optionally transmit an acknowledgment packet to the stylus.

At 324, method 300 may include selectively pairing the stylus to the interactive display. Selectively pairing the stylus may include, at 326, pairing the stylus if at least one stylus communication slot is available. As such, method 300 may include determining, at the interactive display, whether at least one stylus communication slot is available, and responsive to determining that at least one slot is available, pairing the stylus to the display, and responsive to determining that no slot is available, not pairing the stylus to the display. Selectively pairing the stylus may include, at 328, identifying, at the interactive display, a least recently used (LRU) stylus communication slot, and at 330, pairing the stylus at the LRU slot. The LRU stylus communication slot may be identified from among two or more available slots, for example. The two or more stylus communication slots may have been determined to be available based on an evaluation of an activity level of the slots.

At 332, method 300 may include updating, at the interactive display, the broadcast packet. Updating the broadcast packet may include adding the identifier corresponding to the stylus paired at 324, for example.

At 334, method 300 may include transmitting, from the interactive display, an acknowledgment packet to the stylus.

The acknowledgment packet may indicate (e.g., confirm) pairing of the stylus to the interactive display.

At 336, method 300 may include receiving, at the stylus, the acknowledgment packet transmitted at 334. At 338, method 300 may include communicating with the interactive display. The communication may include data transfer along the electrostatic and/or radio link, for example. In some implementations, the stylus may communicate with the interactive display in response to receiving the acknowledgment packet, while in other implementations the stylus may initiate communication with the display in response to identifying its identifier in the broadcast packet, in which case transmission of the acknowledgment packet may be omitted.

In some embodiments, the methods and processes described herein may be tied to a computing system of one or more computing devices. In particular, such methods and processes may be implemented as a computer-application program or service, an application-programming interface (API), a library, and/or other computer-program product.

Figure 4:
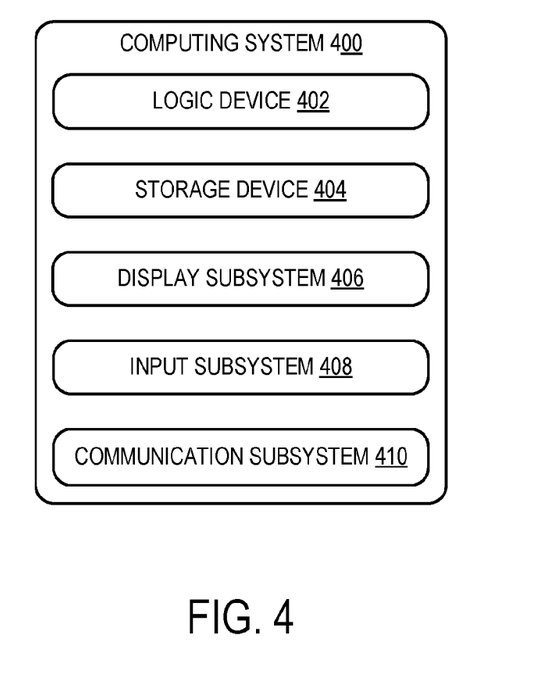
FIG. 4 shows a block diagram of an example computing device.

FIG. 4 schematically shows a non-limiting embodiment of a computing system 400 that can enact one or more of the methods and processes described above. Computing system 400 is shown in simplified form. Computing system 400 may take the form of one or more personal computers, server computers, tablet computers, home-entertainment computers, network computing devices, gaming devices, mobile computing devices, mobile communication devices (e.g., smart phone), and/or other computing devices.

Computing system 400 includes a logic machine 402 and a storage machine 404. Computing system 400 may optionally include a display subsystem 406, input subsystem 408, communication subsystem 410, and/or other components not shown in FIG. 4.

Logic machine 402 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 404 includes one or more physical devices configured to hold instructions executable by the logic machine to implement the methods and processes described herein. When such methods and processes are implemented, the state of storage machine 404 may be transformed—e.g., to hold different data.

Storage machine 404 may include removable and/or built-in devices. Storage machine 404 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 404 may include volatile, nonvolatile, dynamic, static, read/write, read-only, random-access, sequential-access, location-addressable, file-addressable, and/or content-addressable devices.

It will be appreciated that storage machine 404 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 402 and storage machine 404 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 implemented to perform a particular function. In some cases, a module, program, or engine may be instantiated via logic machine 402 executing instructions held by storage machine 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 406 may be used to present a visual representation of data held by storage machine 404. This visual representation may take the form of a graphical user interface (GUI). As the herein described methods and processes change the data held by the storage machine, and thus transform the state of the storage machine, the state of display subsystem 406 may likewise be transformed to visually represent changes in the underlying data. Display subsystem 406 may include one or more display devices utilizing virtually any type of technology. Such display devices may be combined with logic machine 402 and/or storage machine 404 in a shared enclosure, or such display devices may be peripheral display devices.

When included, input subsystem 408 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 410 may be configured to communicatively couple computing system 400 with one or more other computing devices. Communication subsystem 410 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 400 to send and/or receive messages to and/or from other devices via a network such as the Internet.

Another example provides a stylus comprising a process and memory holding instructions executable by the processor to before sending a pairing request to a display, receive a broadcast packet indicating an occupancy of a set of stylus communication slots of the display, determine that at least one stylus communication slot is available based on the broadcast packet, and responsive to determining that the at least one stylus communication slot is available, selectively send the pairing request to occupy a stylus communication slot based on a pairing request history. In such an example, the pairing request history alternatively or additionally may include a number of pairing requests sent by the stylus, and selectively sending the pairing request to occupy the stylus communication slot based on the pairing request history alternatively or additionally may include sending the pairing request after an interval, the interval increasing as a function of the number of pairing requests sent by the stylus. In such an example, the instructions alternatively or additionally may be executable to, after sending the pairing request to occupy the stylus communication slot, receive an acknowledgment packet indicating pairing of the stylus to the display. In such an example, the instructions alternatively or additionally may be executable to, after receiving the acknowledgment packet, communicate with the display via an electrostatic link. In such an example, the pairing request alternatively or additionally may be sent via a radio link. In such an example, the set of stylus communication slots alternatively or additionally may be a set of temporal stylus communication slots. In such an example, the instructions alternatively or additionally may be executable to determine that no stylus communication slot is available, and responsive to determining that no stylus communication slot is available, wait for a future broadcast packet indicating stylus communication slot availability before sending the pairing request. In such an example, the instructions alternatively or additionally may be executable to after sending the pairing request, update the pairing request history. In such an example, determining that at least one stylus communication slot is available alternatively or additionally may include determining that at least two stylus communication slots are available, and the instructions alternatively or additionally may be executable to randomly select one of the at least two available stylus communication slots for sending the pairing request. In such an example, the broadcast packet alternatively or additionally may include an identifier of each stylus occupying a respective stylus communication slot, and the instructions alternatively or additionally may be executable to not send the pairing request responsive to identifying a match between an identifier of the stylus and an identifier of one of the styluses occupying a respective stylus communication slot. Any or all of the above-described examples may be combined in any suitable manner in various implementations.

Another example provides on a stylus, a method, comprising before sending a pairing request to a display, receiving a broadcast packet indicating an occupancy of a set of stylus communication slots of the display, determining that at least one stylus communication slot is available based on the broadcast packet, and responsive to determining that the at least one stylus communication slot is available, selectively sending the pairing request to occupy a stylus communication slot based on a pairing request history. In such an example, the pairing request history alternatively or additionally may include a number of pairing requests sent by the stylus, and selectively sending the pairing request to occupy the stylus communication slot based on the pairing request history alternatively or additionally may include sending the pairing request after an interval, the interval increasing as a function of the number of pairing requests sent by the stylus. In such an example, the method alternatively or additionally may comprise determining that no stylus communication slot is available, and responsive to determining that no stylus communication slot is available, waiting for a future broadcast packet indicating stylus communication slot availability before sending the pairing request. In such an example, the method alternatively or additionally may comprise, after sending the pairing request, updating the pairing request history. In such an example, determining that at least one stylus communication slot is available alternatively or additionally may include determining that at least two stylus communication slots are available, and the method alternatively or additionally may comprise randomly selecting one of the at least two available stylus communication slots for sending the pairing request. Any or all of the above-described examples may be combined in any suitable manner in various implementations.

Another example provides a display, comprising a processor, and memory holding instructions executable by the processor to determine an occupancy of a set of stylus communication slots, transmit a broadcast packet indicating the occupancy of the set of stylus communication slots, the broadcast packet configured to trigger transmission of a pairing request from a stylus if the broadcast packet indicates stylus communication slot availability, receive a pairing request from the stylus to occupy one of the set of stylus communication slots, and responsive to determining that at least one stylus communication slot is available, pair the stylus to the display. In such an example, the instructions alternatively or additionally may be executable to evaluate an activity level of the stylus communication slots, and based on the evaluation, determine that two or more of the stylus communication slots exceed a threshold inactivity, identify a least recently used stylus communication slot from among the two or more stylus communication slots that exceed the threshold inactivity, and pair the stylus to the display through the least recently used stylus communication slot. In such an example, the instructions alternatively or additionally may be executable to determine that a stylus communication slot exceeds a threshold inactivity, unpair an occupant of the stylus communication slot that exceeds the threshold inactivity, and designate the stylus communication slot that exceeds the threshold inactivity as being available. In such an example, the instructions alternatively or additionally may be executable to, after designating the stylus communication slot as being available, transmit an updated broadcast packet indicating availability of the stylus communication slot. In such an example, the display alternatively or additionally may comprise a radio transceiver, where the broadcast packet alternatively or additionally may be transmitted via the radio transceiver. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A stylus, comprising:
    a processor; and
    memory holding instructions executable by the processor to:
        before sending a pairing request to a display, receive a broadcast packet indicating, for each of a set of stylus communication slots of the display, an occupancy of the stylus communication slot;
        determine that at least one stylus communication slot is available based on the broadcast packet; and
        responsive to determining that the at least one stylus communication slot is available, selectively send the pairing request to occupy a stylus communication slot based on a pairing request history.

2. The stylus of claim 1, where the pairing request history includes a number of pairing requests sent by the stylus, and where selectively sending the pairing request to occupy the stylus communication slot based on the pairing request history includes sending the pairing request after an interval, the interval increasing as a function of the number of pairing requests sent by the stylus.

3. The stylus of claim 1, where the instructions are further executable to, after sending the pairing request to occupy the stylus communication slot, receive an acknowledgment packet indicating pairing of the stylus to the display.

4. The stylus of claim 3, where the instructions are further executable to, after receiving the acknowledgment packet, communicate with the display via an electrostatic link.

5. The stylus of claim 1, where the pairing request is sent via a radio link.

6. The stylus of claim 1, where the set of stylus communication slots is a set of temporal stylus communication slots.

7. The stylus of claim 1, where the instructions are further executable to:
    determine that no stylus communication slot is available; and
    responsive to determining that no stylus communication slot is available, wait for a future broadcast packet indicating stylus communication slot availability before sending the pairing request.

8. The stylus of claim 1, where the instructions are further executable to, after sending the pairing request, update the pairing request history.

9. The stylus of claim 1, where determining that at least one stylus communication slot is available includes determining that at least two stylus communication slots are available, and where the instructions are further executable to randomly select one of the at least two available stylus communication slots for sending the pairing request.

10. The stylus of claim 1, where the broadcast packet includes an identifier of each stylus occupying a respective stylus communication slot, and where the instructions are further executable to not send the pairing request responsive to identifying a match between an identifier of the stylus and an identifier of one of the styluses occupying a respective stylus communication slot.

11. On a stylus, a method, comprising:
    before sending a pairing request to a display, receiving a broadcast packet indicating, for each of a set of stylus communication slots of the display, an occupancy of the stylus communication slot;
    determining that at least one stylus communication slot is available based on the broadcast packet; and
    responsive to determining that the at least one stylus communication slot is available, selectively sending the pairing request to occupy a stylus communication slot based on a pairing request history.

12. The method of claim 11, where the pairing request history includes a number of pairing requests sent by the stylus, and where selectively sending the pairing request to occupy the stylus communication slot based on the pairing request history includes sending the pairing request after an interval, the interval increasing as a function of the number of pairing requests sent by the stylus.

13. The method of claim 11, further comprising:
    determining that no stylus communication slot is available; and
    responsive to determining that no stylus communication slot is available, waiting for a future broadcast packet indicating stylus communication slot availability before sending the pairing request.

14. The method of claim 11, further comprising, after sending the pairing request, updating the pairing request history.

15. The method of claim 11, where determining that at least one stylus communication slot is available includes determining that at least two stylus communication slots are available, the method further comprising randomly selecting one of the at least two available stylus communication slots for sending the pairing request.

16. A display, comprising:
    a processor; and
    memory holding instructions executable by the processor to:
        determine an occupancy of a set of stylus communication slots;
        transmit a broadcast packet indicating, for each of the set of stylus communication slots, an occupancy of the stylus communication slot, the broadcast packet configured to trigger transmission of a pairing request from a stylus if the broadcast packet indicates stylus communication slot availability;
        receive a pairing request from the stylus to occupy one of the set of stylus communication slots; and
        responsive to determining that at least one stylus communication slot is available, pair the stylus to the display.

17. The display of claim 16, where the instructions are further executable to:
    identify a least recently used stylus communication slot from among the two or more stylus communication slots that exceed the threshold inactivity; and
    pair the stylus to the display through the least recently used stylus communication slot.

18. The display of claim 16, where the instructions are further executable to:
- determine that a stylus communication slot exceeds a threshold inactivity;
- unpair an occupant of the stylus communication slot that exceeds the threshold inactivity; and
- designate the stylus communication slot that exceeds the threshold inactivity as being available.

19. The display of claim 18, where the instructions are further executable to, after designating the stylus communication slot as being available, transmit an updated broadcast packet indicating availability of the stylus communication slot.

20. The display of claim 16, further comprising a radio transceiver, where the broadcast packet is transmitted via the radio transceiver.

\* \* \* \* \*